(12) United States Patent
Takeda et al.

(10) Patent No.: US 11,307,396 B2
(45) Date of Patent: Apr. 19, 2022

(54) VIRTUAL IMAGE DISPLAY APPARATUS

(71) Applicant: SEIKO EPSON CORPORATION, Tokyo (JP)

(72) Inventors: Takashi Takeda, Suwa (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 336 days.

(21) Appl. No.: 16/524,537

(22) Filed: Jul. 29, 2019

(65) Prior Publication Data
US 2020/0033573 A1      Jan. 30, 2020

(30) Foreign Application Priority Data

Jul. 30, 2018   (JP) .............................. JP2018-142207

(51) Int. Cl.
*G02B 17/08*   (2006.01)
*G02B 27/01*   (2006.01)

(52) U.S. Cl.
CPC ..... *G02B 17/0856* (2013.01); *G02B 27/0172* (2013.01); *G02B 2027/0178* (2013.01)

(58) Field of Classification Search
CPC ............ G02B 17/0856; G02B 27/0172; G02B 2027/0178

USPC .......................................................... 359/861
See application file for complete search history.

(56) References Cited

U.S. PATENT DOCUMENTS

| 6,046,857 | A | * | 4/2000 | Morishima | ........ G02B 27/0172 |
| | | | | | 359/434 |
| 7,352,521 | B2 | * | 4/2008 | Matsunaga | ............ G02B 13/06 |
| | | | | | 353/28 |
| 2009/0147331 | A1 | * | 6/2009 | Ashkenazi | ............... G02B 5/32 |
| | | | | | 359/13 |
| 2018/0299670 | A1 | * | 10/2018 | Takahashi | .......... G02B 27/0172 |

FOREIGN PATENT DOCUMENTS

JP          H09-189880 A      7/1997

* cited by examiner

*Primary Examiner* — Collin X Beatty
(74) *Attorney, Agent, or Firm* — Oliff PLC

(57) ABSTRACT

A virtual image display apparatus includes a display device (image forming unit), a first mirror member configured to reflect imaging light from the display device, a second mirror member configured to reflect imaging light reflected by the first mirror member, and a third mirror member of a transmissive type configured to reflect imaging light reflected by the second mirror member toward a position of an exit pupil. One of the first mirror member and the second mirror member is a refractive reflective optical member that includes a refractive member including a refractive surface, and a mirror surface formed at a non-refractive surface of the refractive member.

13 Claims, 8 Drawing Sheets

VIRTUAL IMAGE DISPLAY APPARATUS

The present application is based on and claims priority from JP-A-2018-142207, filed Jul. 30, 2018, the disclosure of which is hereby incorporated by reference herein in its entirety.

BACKGROUND

1. Technical Field

The present disclosure relates to a head-mounted display including a mirror and the other virtual image display apparatus, and more particularly, to a virtual image display apparatus that is configured to provide see-through view.

2. Related Art

In recent years, various types of a virtual image display apparatus in which imaging light from a display element is guided to a pupil of an observer by an optical element such as a mirror and a light guide are proposed as a virtual image display apparatus, which enables formation and observation of a virtual image, like a head-mounted display.

An optical system described in JP-A-9-189880 is constituted by four eccentric curved mirrors, a first eccentric curved mirror has a rotating elliptic surface or an aspheric surface based on a rotating elliptic surface, and a second eccentric curved mirror has a hyperboloid or an aspheric surface based on a hyperboloid. Weight reduction is more easily achieved by constituting the optical system with the eccentric curved mirrors than when a light guide is used.

However, when the optical system is constituted only by the eccentric curved mirrors, optical surfaces, i.e., reflecting surfaces cannot be brought close to each other to an extent of approximately the size of itself or less. Thus, correction of an aberration is more likely to be insufficient, and resolution and the other optical performance cannot be secured, which does not facilitate increasing an angle of view.

SUMMARY

A virtual image display apparatus according to one aspect of the present disclosure includes an image forming unit, a first mirror member configured to reflect imaging light from the image forming unit, a second mirror member configured to reflect the imaging light reflected by the first mirror member, and a third mirror member of a transmissive type configured to reflect the imaging light reflected by the second mirror member toward a position of an exit pupil. One of the first mirror member and the second mirror member is a refractive reflective optical member that includes a refractive member including a refractive surface and a mirror surface formed at a non-refractive surface of the refractive member.

DESCRIPTION OF EXEMPLARY EMBODIMENTS

First Exemplary Embodiment

Next, a virtual image display apparatus according to First Exemplary Embodiment of the present disclosure will be described with reference to drawings.

Figure 1:
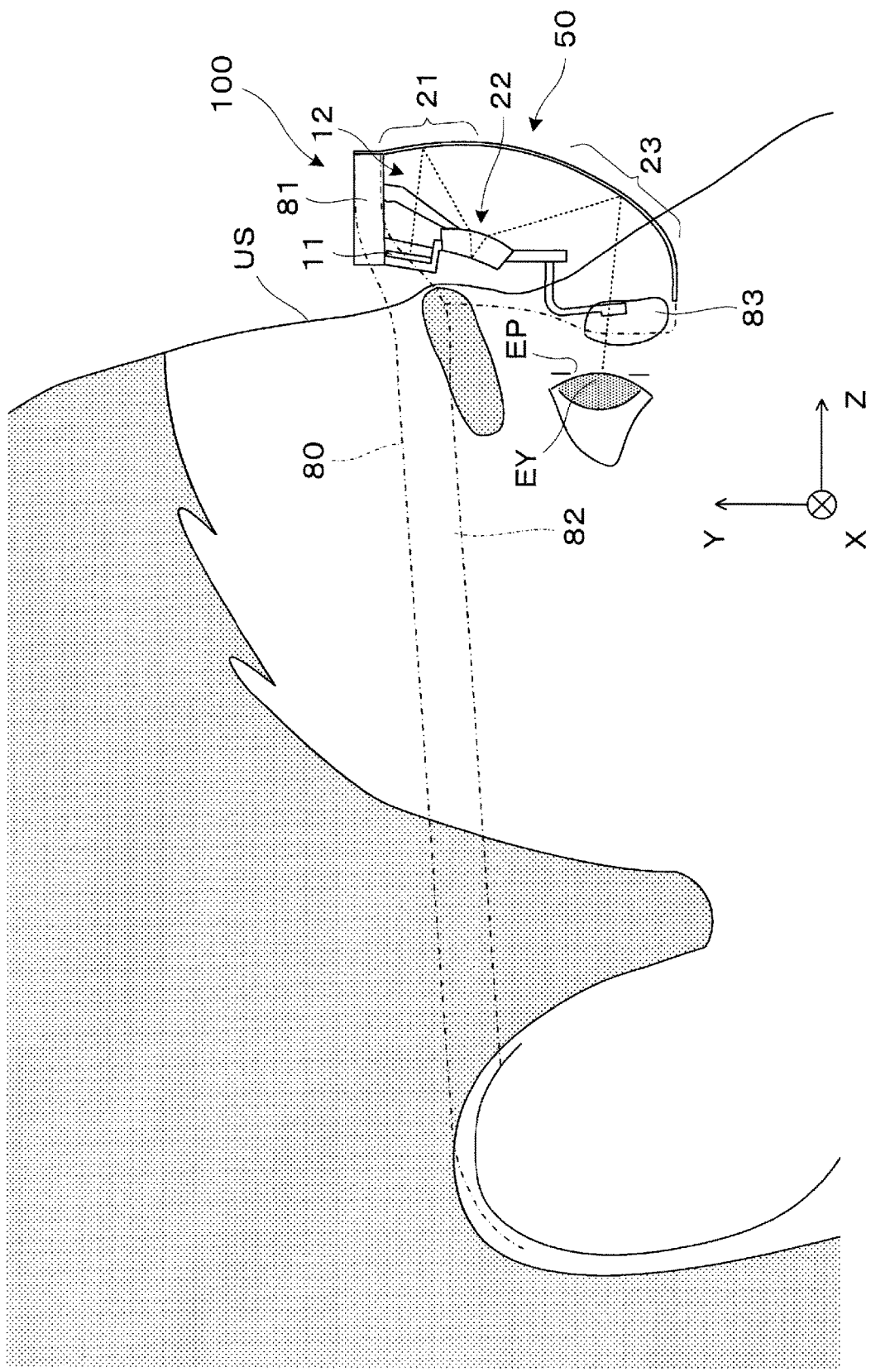
FIG. 1 is a side cross-sectional view illustrating a virtual image display apparatus according to First Exemplary Embodiment.
Figure 2:
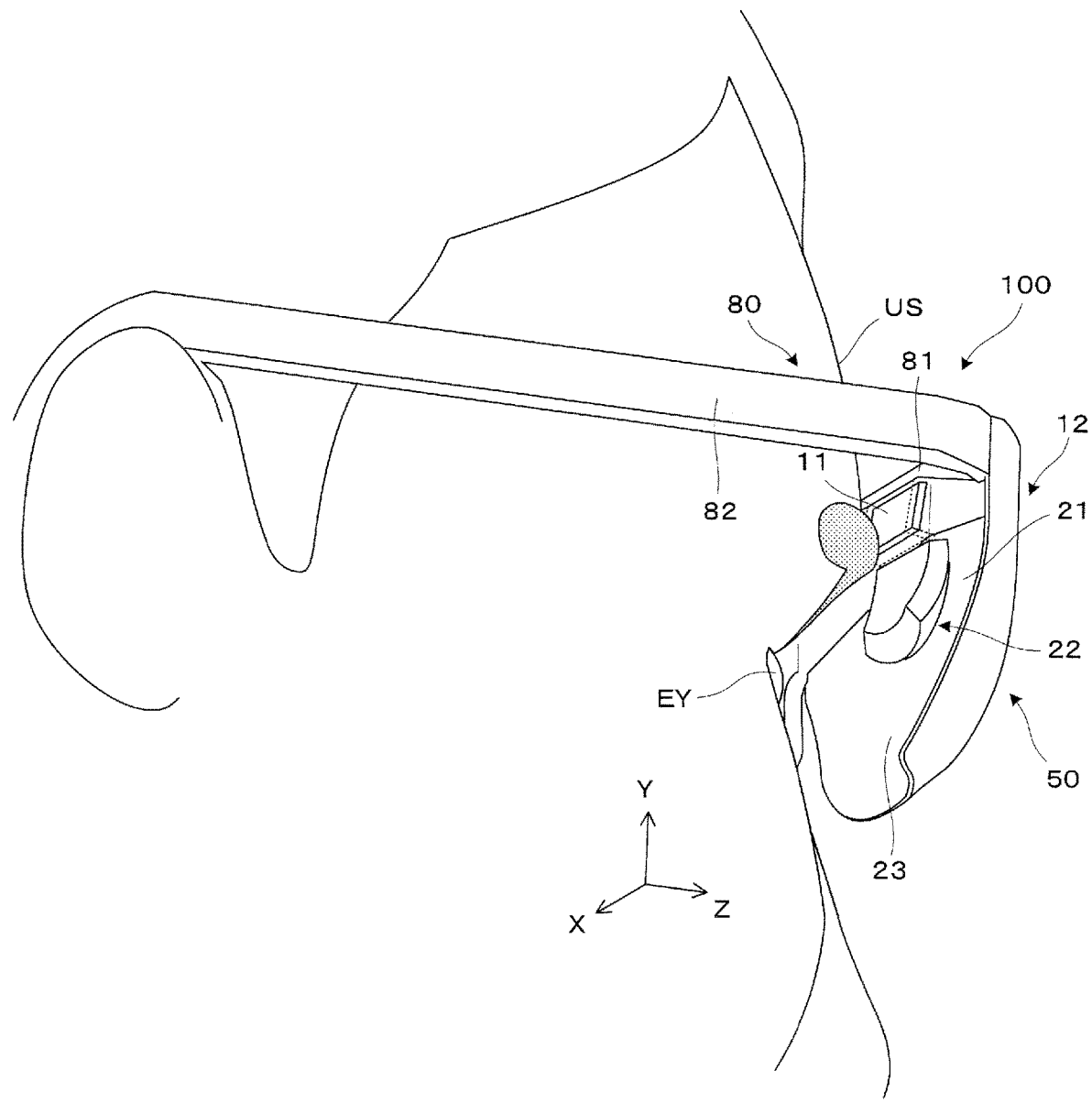
FIG. 2 is a perspective view illustrating the virtual image display apparatus according to First Exemplary Embodiment when viewed from diagonally below.
Figure 3:
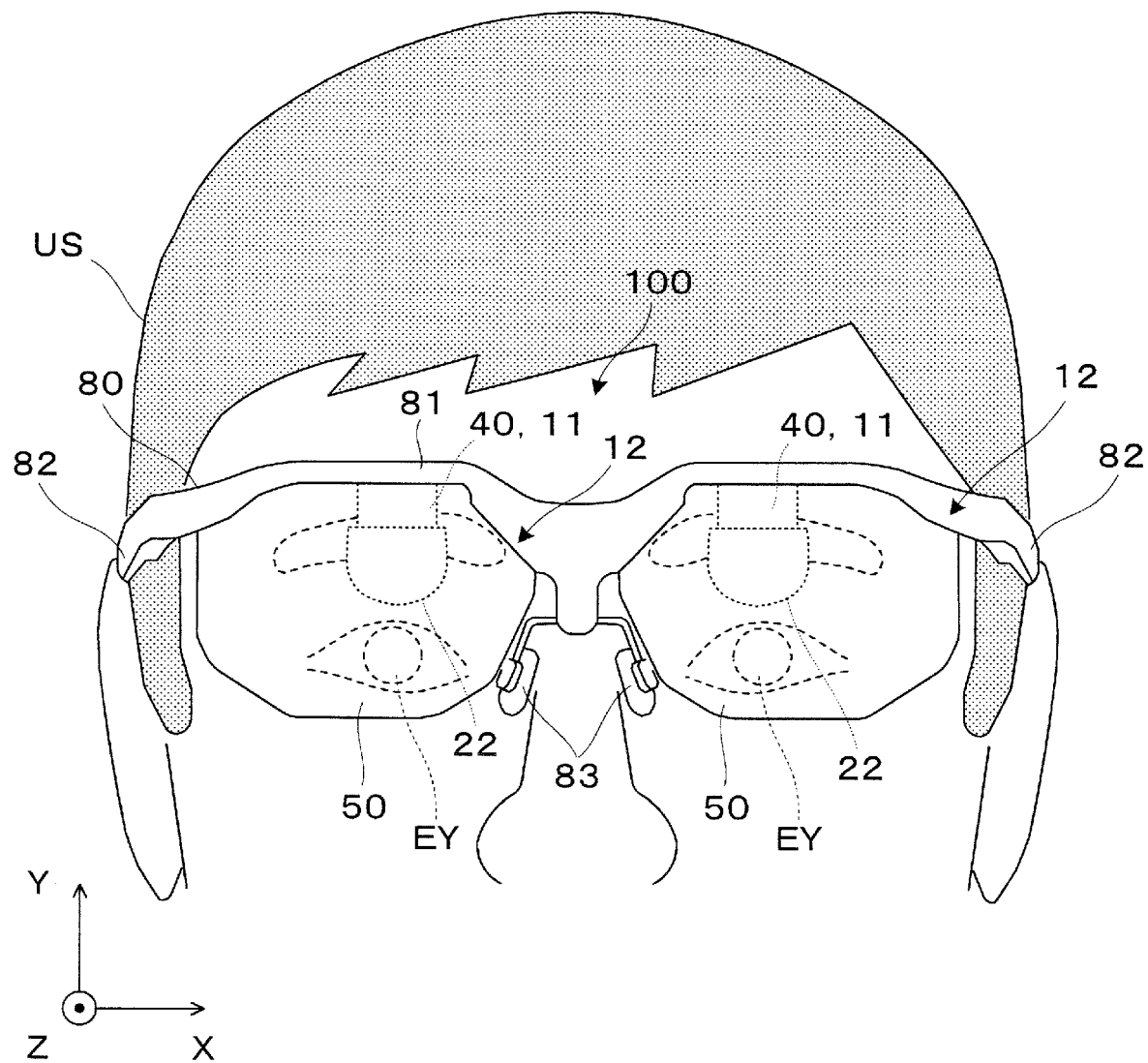
FIG. 3 is a front view illustrating the virtual image display apparatus according to First Exemplary Embodiment.

In FIGS. 1 to 3, X, Y and Z are an orthogonal coordinate system, an X direction corresponds to a lateral direction in which both eyes of an observer US wearing a virtual image display apparatus 100 are aligned, a Y direction corresponds to an upward direction orthogonal to the lateral direction in which both eyes of the observer US are aligned, and a Z direction corresponds to a front direction of the observer US or a front surface direction.

The illustrated virtual image display apparatus 100 is a head-mounted display, and causes the observer US to recognize a video as a virtual image. The virtual image display apparatus 100 includes a display device 11 and a projection optical system 12. The projection optical system 12 includes a first mirror member 21, a second mirror member 22, and a third mirror member 23. Herein, the second mirror member 22 is a refractive reflective optical member 30 that includes a refractive member 22*b* and a mirror surface 22*r*. The display device 11 and the second mirror member 22 are integrally fixed and are supported by a body member 81 of a frame 80 on an upper portion. Further, the first mirror member 21 and the third mirror member 23 are connected to each other and constitute an integral appearance member 50, and are supported by the body member 81 of the frame 80 on the upper portion and a side portion. The appearance member 50 is disposed in a state of being positioned on the outer side or an external side with respect to both of the display device 11 and the second mirror member 22. The appearance member 50 has an outline having a shape of eyeglasses, and has a curved shape being convex outward over eyes of the observer US. Note that FIG. 1 and the like illustrate only the virtual image display apparatus 100 for the right eye, but the virtual image display apparatus 100 for the left eye has the same structure, and a virtual image display apparatus having an appearance like eyeglasses as a whole is formed by combining virtual image display apparatuses for both eyes. Note that, one of portions for the right eye and the left eye may be omitted from the virtual image display apparatuses for both eyes, and, in this case, a one-eye head-mounted display is obtained. In describing an overview of an optical path, imaging light GL emitted from the display device 11 is reflected by the first mirror member 21 and incident on the second mirror member 22. The imaging light GL incident on the second mirror member 22 is refracted and also reflected by the second mirror member 22 and emitted to the outside of the second mirror member 22. The imaging light GL emitted from the second mirror member 22 is reflected by the third mirror member 23 of the transmissive type and incident on a position of an exit pupil EP.

The frame 80 has a structure similar to that of eyeglasses, and includes a sidepiece portion 82 connected to a lateral end portion of the body member 81, and a nose pad 83 at a tip of a metal fitting extending from the center of the body member 81.

Figure 4:
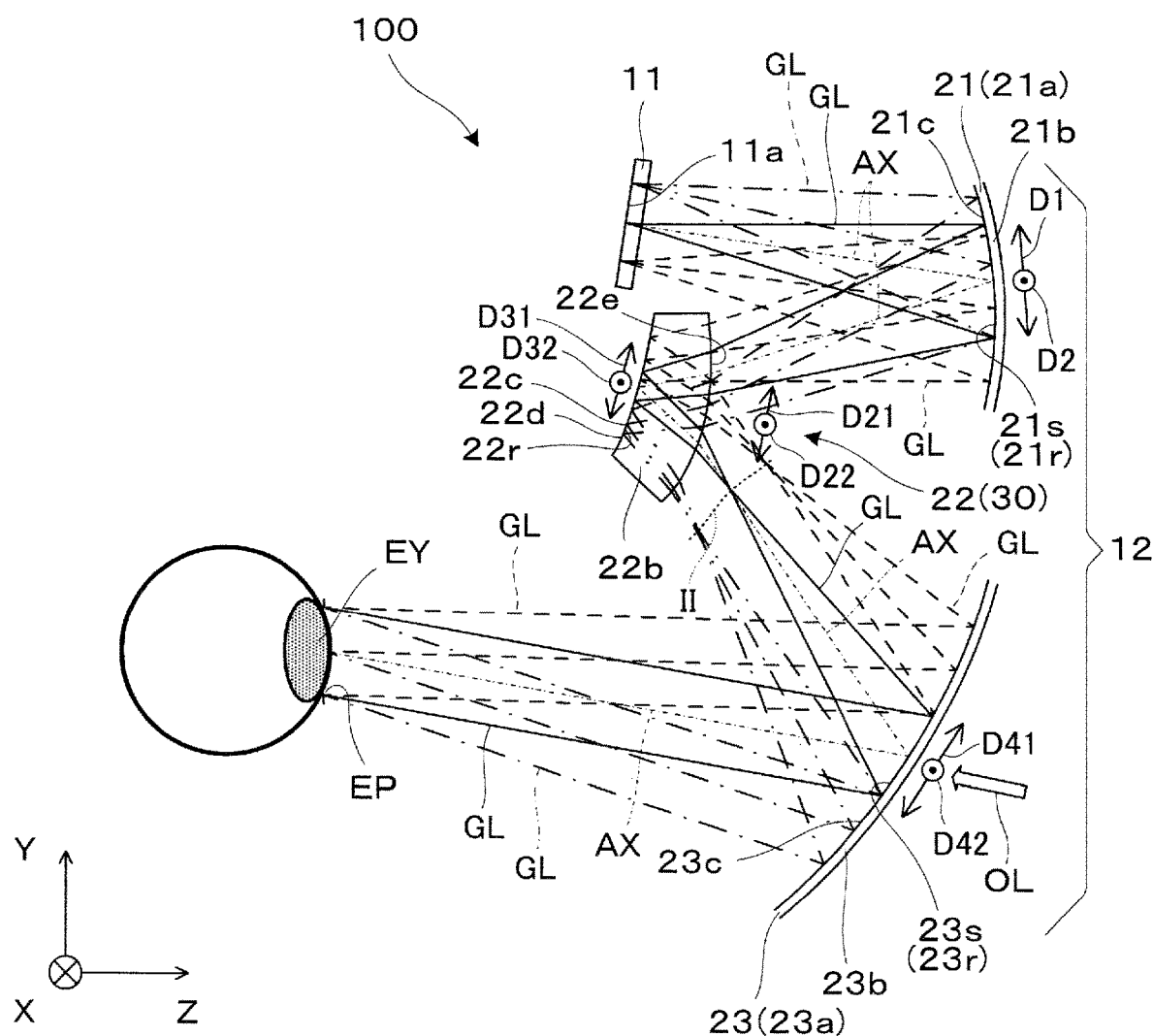
FIG. 4 is a side cross-sectional view illustrating an optical structure and the like of the virtual image display apparatus according to First Exemplary Embodiment.

With reference to FIG. 4, the display device 11 is an image forming unit, and is disposed on the upper side or the +Y side of the projection optical system 12 corresponding to a head side of the observer US. The display device (image forming unit) 11 is a self-luminous type display element typified by, for example, an organic electro-luminescence (organic EL), an inorganic EL, an LED array, an organic LED, a laser array, a quantum dot emission type element, and the like, and forms a still image or a moving image in color on a two-dimensional display surface 11a. The display device 11 is driven by a drive control circuit (not illustrated) and performs a display operation. When an organic EL display is used as the display device 11, the display device 11 is configured to include an organic EL control unit. When a quantum dot display is used as the display device 11, the display device 11 is configured to emit green or red color by causing light of a blue light emitting diode (LED) to pass through a quantum dot film. The display device 11 is not limited to a self-luminous display element, and may be constituted by an LCD or the other light modulating element, and may form an image by illuminating the light modulating element with a light source such as a backlight. As the display device 11, a liquid crystal on silicon (LCOS, LCoS is a trade name), a digital micromirror device, and the like may be used instead of the LCD.

Figure 5:
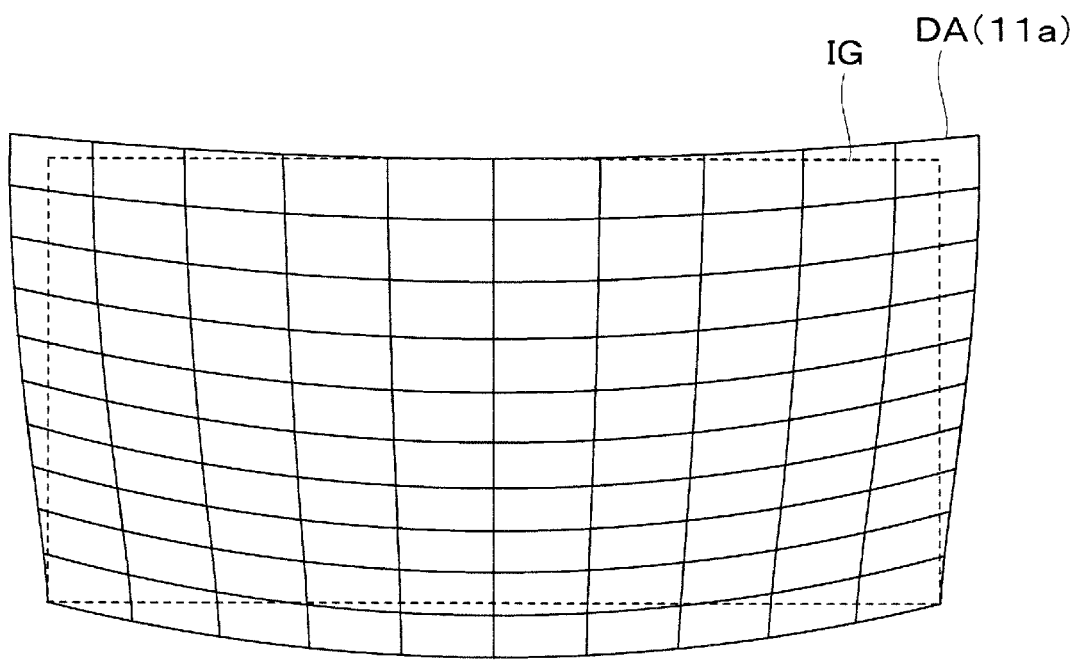
FIG. 5 is a diagram illustrating a compulsory distortion of a display image formed on a display device.

As illustrated in FIG. 5, a display image DA formed on the display surface 11a of the display device 11 is a modification image with a trapezoidal distortion as viewed from a distortion of a virtual grid. As described later, since the projection optical system 12 is an eccentric optical system, it is not easy to remove all distortion such as the trapezoidal distortion. Thus, even when the distortion remains in the projection optical system 12, by providing a distortion beforehand to the display image DA formed on the display surface 11a, a pixel array of a projected image IG of a virtual image observed in a position of the exit pupil EP via the projection optical system 12 can have a grid pattern, and an outline can be rectangular. As a result, the observer US can observe the projection image IG with less distortion, which facilitates correction of the other aberration in the projection optical system 12. The display image (modification image) DA formed on the display surface 11a may be a display image in which a compulsory distortion is formed by image processing. When the display surface 11a is rectangular, a margin is formed by forming a compulsory distortion, but additional information may be displayed in such a margin. The display image (modification image) DA formed on the display surface 11a is not limited to a display image in which a compulsory distortion is formed by image processing, and, for example, an array of display pixels formed on the display surface 11a may correspond to a compulsory distortion. In this case, image processing for correcting the distortion is not needed. Furthermore, the display surface 11a may be curved to correct an aberration.

Referring back to FIG. 4, the projection optical system 12 is a non-coaxial optical system or an eccentric optical system that uses oblique incidence or non-specular reflection. An eccentric direction of the projection optical system 12 is defined by the arrangement of the first mirror member 21, the second mirror member 22, and the like. Specifically, the first mirror member 21, the second mirror member 22, and the third mirror member 23 have the eccentric direction set within a YZ plane. In other words, an optical axis AX passing through the first mirror member 21, the second mirror member 22, and the third mirror member 23 is arranged along a plane that intersects the lateral direction in which a pair of pupils EY of an observer are aligned, i.e., the X direction and extends in a substantially vertical direction, and more specifically, is disposed along the YZ plane that is orthogonal to the X direction and extends in the vertical direction. The optical axis AX is disposed along the vertical YZ plane, and thus an angle of view in the lateral direction is easily increased. Even when a plane including the optical axis AX is inclined in a clockwise direction or a counter-clockwise direction (i.e., left or right) around the Z axis by a few 10°, an influence on the angle of view is not greatly increased with the optical axis AX extending in the substantially vertical direction. Further, the first mirror member 21 is disposed on the upper side or the +Y side of the second mirror member 22 corresponding to the head side of the observer US, and the second mirror member 22 is disposed on the upper side or the +Y side of the third mirror member 23 corresponding to the head side of the observer US. Herein, the upper side or the +Y side is considered, with an intersection or a point of contact between each of the mirror members 21, 22, and 23 and the optical axis AX being a reference.

Figure 6:
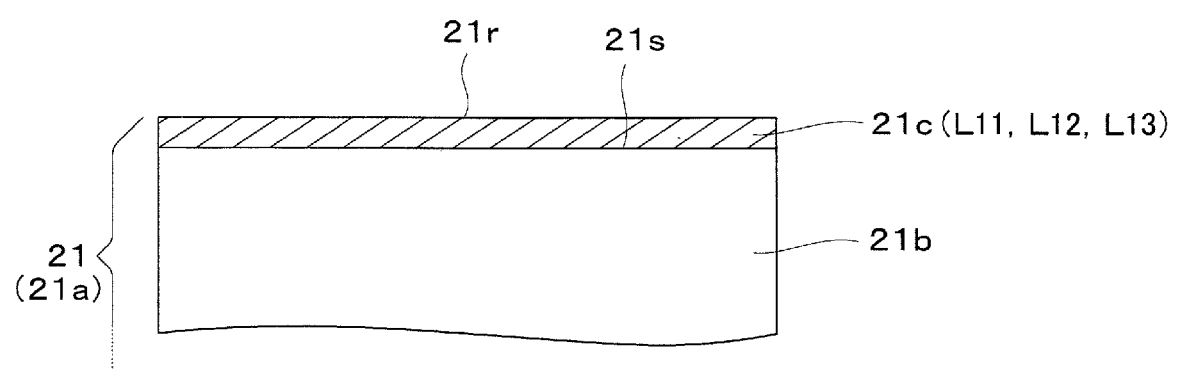
FIG. 6 is an enlarged cross-sectional view illustrating a structure of a reflecting surface and the like of a first mirror member.

The first mirror member 21 is a plate-like piece that functions as a concave surface mirror, and reflects the imaging light GL from the display device 11. In other words, the first mirror member 21 is a mirror plate 21a having a structure in which a mirror film 21c is formed at one surface 21s of a plate-like body 21b (see FIG. 6). A reflecting surface 21r of the first mirror member 21 is, for example, a free curved surface, and has a shape corresponding to a surface of the mirror film 21c or the surface 21s of the plate-like body 21b. The reflecting surface 21r is not limited to a free curved surface, and may be an aspheric surface. The reflecting surface 21r is asymmetric across the optical axis AX with respect to a first direction D1 corresponding to the eccentric direction in the YZ plane, and is symmetric across the optical axis AX with respect to a second direction D2 or the X direction orthogonal to the first direction D1. The plate-like body 21b of the first mirror member 21 is made of, for example, resin, but may also be made of glass. The mirror film 21c is formed of a single layer film L11 or a multilayer film L12 of metal such as Al and Ag, for example, but may also be a dielectric multilayer film L13. The mirror film 21c may be formed by lamination including a technique such as vapor deposition, but may also be formed by bonding a sheet-shaped reflective film.

In the first mirror member 21 described above, an aberration reduction can be achieved by setting the reflecting surface 21r to be a free curved surface or an aspheric surface, and, particularly when a free curved surface is used, an aberration of the projection optical system 12 being a non-coaxial optical system or an eccentric optical system can be easily reduced. Note that the free curved surface is a surface without an axis of rotational symmetry, and various polynomials may be used as a surface function of the free curved surface. In addition, the aspheric surface is a surface having an axis of rotational symmetry, but is a paraboloid or a surface other than a spherical surface expressed by a polynomial.

Figure 7:
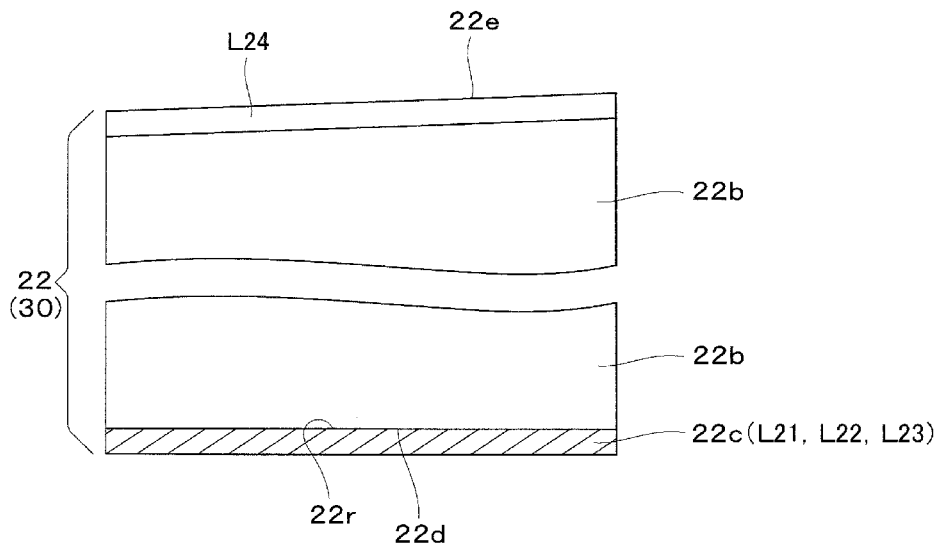
FIG. 7 is an enlarged cross-sectional view illustrating a structure of a refractive surface, a reflecting surface, and the like of a second mirror member.

The second mirror member 22 is the refractive reflective optical member 30 being a prismatic member that functions as a lens and a mirror, and refracts and also reflects the imaging light GL from the first mirror member 21. The second mirror member 22 or the refractive reflective optical member 30 includes the refractive member 22b including a refractive surface 22e, and a mirror layer 22c formed at a non-refractive surface 22d of the refractive member 22b (see FIG. 7). The refractive member 22b of the second mirror member 22 is made of, for example, resin, but may also be made of glass. The refractive member 22b may be formed of a material having an Abbe number of greater than or equal to 50 in terms of suppressing occurrence of chromatic aberrations. The mirror layer 22c is formed of a single layer film L21 or a multilayer film L22 of metal such as Al and Ag, for example, but may also be a dielectric multilayer film L23. The mirror layer 22c may be formed by lamination, but may also be formed by bonding a sheet-shaped reflective film.

The refractive surface 22e of the second mirror member 22 is, for example, a free curved surface, but may also be an aspheric surface. The refractive surface 22e is a common incidence-emission surface through which the imaging light GL passes before and after reflection by the mirror surface 22r. In other words, a light beam from the first mirror member 21 is refracted by the refractive surface 22e and incident into the second mirror member 22, and, when being reflected by the mirror surface 22r and emitted to the outside of the second mirror member 22, the light beam is refracted again by the refractive surface 22e. The refractive surface 22e is asymmetric across the optical axis AX with respect to a first direction D21 corresponding to the eccentric direction in the YZ plane, and is symmetric across the optical axis AX with respect to a second direction D22 or the X direction orthogonal to the first direction D21. An antireflective coating L24 is formed on the refractive surface 22e.

The mirror surface 22r of the second mirror member 22 is, for example, a free curved surface, and has a shape corresponding to an inner surface of the mirror layer 22c or the non-refractive surface 22d of the refractive member 22b. The mirror surface 22r is not limited to a free curved surface, and may be an aspheric surface. The mirror surface 22r is asymmetric across the optical axis AX with respect to a first direction D31 corresponding to the eccentric direction in the YZ plane, and is symmetric across the optical axis AX with respect to a second direction D32 or the X direction orthogonal to the first direction D31.

Figure 8:
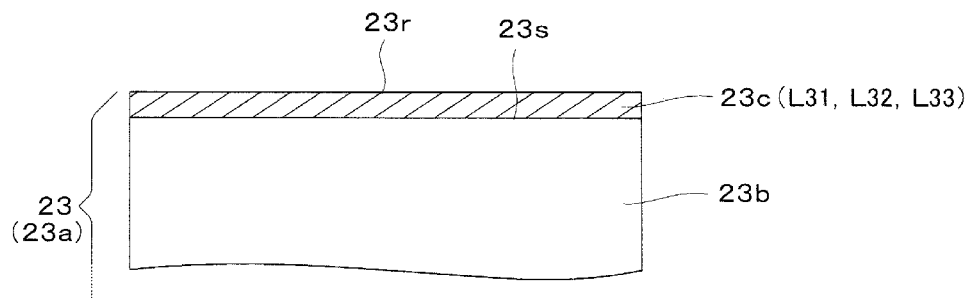
FIG. 8 is an enlarged cross-sectional view illustrating a structure of a reflecting surface and the like of a third mirror member.

The third mirror member 23 is a plate-like piece that functions as a concave surface mirror, and reflects the imaging light GL from the second mirror member 22. The third mirror member 23 covers a position of the exit pupil EP in which the pupil EY is located, and also has a concave shape toward the position of the exit pupil EP. The third mirror member 23 is a mirror plate 23a having a structure in which a mirror film 23c is formed at one surface 23s of a plate-like body 23b (see FIG. 8). A reflecting surface 23r of the third mirror member 23 is, for example, a free curved surface, and has a shape corresponding to a surface of the mirror film 23c or the surface 23s of the plate-like body 23b.

The reflecting surface 23r is not limited to a free curved surface, and may be an aspheric surface. The reflecting surface 23r is asymmetric across the optical axis AX with respect to a first direction D41 corresponding to the eccentric direction in the YZ plane, and is symmetric across the optical axis AX with respect to a second direction D42 or the X direction orthogonal to the first direction D41.

The third mirror member 23 is a transmissive type reflection element that allows transmission of a part of light upon reflection, and the mirror film 23c of the third mirror member 23 has semi-transmissive property. As a result, external light OL passes through the third mirror member 23, thus see-through view of externals is enabled and a virtual image can be superimposed on an external image. At this time, when the plate-like body 23b has a thickness of less than or equal to approximately few millimeters, a change in magnification of the external image can be suppressed to low. A reflectance of the mirror film 23c with respect to the imaging light GL and the external light OL is set to be greater than or equal to 10% and less than or equal to 50% in a range of an incident angle of the assumed imaging light GL in terms of securing luminance of the imaging light GL and facilitating the observation of an external image by see-through. The plate-like body 23b of the third mirror member 23 is made of, for example, resin, but may also be made of glass. The mirror film 23c is formed of, for example, a dielectric multilayer film L31 including a plurality of dielectric layers having a film thickness adjusted. The mirror film 23c may also be a single layer film L32 or a multilayer film L33 of metal such as Al and Ag having a film thickness adjusted. The mirror layer 23c may be formed by lamination, but may also be formed by bonding a sheet-shaped reflective film.

A distance between the second mirror member 23 and the position of the exit pupil EP and a distance on the optical path between the third mirror member 23 and the position of the exit pupil EP are set to be greater than or equal to 14 mm along the optical axis AX of the emission side or the Z axis, and a space in which the eyeglasses are disposed is secured. An antireflective coating may be formed on an external side of the third mirror member 23.

In the exemplary embodiment described above, an aberration reduction can be achieved by setting the reflecting surface 21r of the first mirror member 21, the refractive surface 22e of the second mirror member 22, the mirror surface 22r of the second mirror member 22, and the reflecting surface 23r of the third mirror member 23 to be free curved surfaces or aspheric surfaces, and, particularly when a free curved surface is used, an aberration of the projection optical system 12 being a non-coaxial optical system or an eccentric optical system can be easily reduced.

In describing the optical path, the imaging light GL from the display device 11 is incident on the first mirror member 21 and reflected at a high reflectance close to 100% by the reflecting surface 21r. The imaging light GL reflected by the first mirror member 21 is incident on the second mirror member 22, refracted by the refractive surface 22e, reflected at a high reflectance close to 100% by the mirror surface 22r, and refracted again by the refractive surface 22e. The imaging light GL from the second mirror member 22 is incident on the third mirror member 23 and reflected at a reflectance of less than or equal to approximately 50% by the reflecting surface 23r. The imaging light GL reflected by the third mirror member 23 is incident on the exit pupil EP in which the pupil EY of the observer US is disposed. An intermediate image II is formed between the second mirror member 22 and the third mirror member 23. The intermediate image II is formed by appropriately enlarging an image formed on the display surface 11a of the display device 11. The intermediate image II does not intersect the refractive surface 22e to avoid an influence of debris and the like adhering to the refractive surface 22e. An angle of view observed in the position of the exit pupil EP is assumed to be about 48° diagonally.

The first mirror member 21 and the third mirror member 23 described above are not limited to surface mirrors, and may be rear surface mirrors including the mirror films 21c and 23c formed on rear surfaces of the plate-like bodies 21b and 23b.

As described above, instead of using the second mirror member 22 as the refractive reflective optical member 30, the first mirror member 21 may be used as the refractive reflective optical member 30, and both of the first mirror member 21 and the second mirror member 22 may also be used as the refractive reflective optical member 30.

According to the virtual image display apparatus 100 in First Exemplary Embodiment described above, one of the first mirror member 21 and the second mirror member 22 is the refractive reflective optical member 30 that includes the refractive member 22b including the refractive surface 22e, and the mirror surface 22r formed on the non-refractive surface 22d. Thus, the refractive surface 22e of the refractive member 22b has a function of correcting an aberration while being based on an eccentric mirror system including a plurality of mirrors, and resolution and the other optical performance can be enhanced over a wide angle of view.

Example 1

Hereinafter, Example 1 in which an optical system of the virtual image display apparatus 100 according to First Exemplary Embodiment was realized will be described. In the data of Example 1, a free curved surface is expressed in an xy polynomial surface. A coefficient of the xy polynomial surface is given z as an optical axial direction with the following equation:

$$z = \frac{cr^2}{1+\sqrt{1-(1+k)c^2r^2}} + \sum_{j=2}^{66} C_j x^m y^n \quad j = \frac{(m+n)^2 + m + 3n}{2} + 1$$

where
z: sag amount of surface parallel to z axis
c: vertex curvature
k: conic coefficient
$C_j$: coefficient of monomial $x^m y^n$
r: distance in radius direction ($r=\sqrt{(x^2+y^2)}$).
Note that $C_j = C_j \times \{(\text{normalized radius})^{(m+n-1)}\}$.

Table 1 below is a table specifically describing a coefficient $C_i$.

TABLE 1

| SIGN | | MEANING |
|---|---|---|
| C1 | k | CONIC CONSTANT |
| C2 | x | COEFFICIENT |
| C3 | y | COEFFICIENT |
| C4 | $x^2$ | COEFFICIENT |
| C5 | xy | COEFFICIENT |
| C6 | $y^2$ | COEFFICIENT |
| C7 | $x^3$ | COEFFICIENT |

TABLE 1-continued

| SIGN | | MEANING |
|---|---|---|
| C8 | $x^2y$ | COEFFICIENT |
| C9 | $xy^2$ | COEFFICIENT |
| C10 | $y^3$ | COEFFICIENT |
| C11 | $x^4$ | COEFFICIENT |
| C12 | $x^3y$ | COEFFICIENT |
| C13 | $x^2y^2$ | COEFFICIENT |
| C14 | $xy^3$ | COEFFICIENT |
| C15 | $y^4$ | COEFFICIENT |
| C16 | $x^5$ | COEFFICIENT |
| C17 | $x^4y$ | COEFFICIENT |
| C18 | $x^3y^2$ | COEFFICIENT |
| C19 | $x^2y^3$ | COEFFICIENT |
| C20 | $xy^4$ | COEFFICIENT |
| C21 | $y^5$ | COEFFICIENT |
| C22 | $x^6$ | COEFFICIENT |
| C23 | $x^5y$ | COEFFICIENT |
| C24 | $x^4y^2$ | COEFFICIENT |
| C25 | $x^3y^3$ | COEFFICIENT |
| C26 | $x^2y^4$ | COEFFICIENT |
| C27 | $xy^5$ | COEFFICIENT |
| C28 | $y^6$ | COEFFICIENT |
| C29 | $x^7$ | COEFFICIENT |
| C30 | $x^6y$ | COEFFICIENT |
| C31 | $x^5y^2$ | COEFFICIENT |
| C32 | $x^4y^3$ | COEFFICIENT |
| C33 | $x^3y^4$ | COEFFICIENT |
| C34 | $x^2y^5$ | COEFFICIENT |
| C35 | $xy^6$ | COEFFICIENT |
| C36 | $y^7$ | COEFFICIENT |
| C37 | $x^8$ | COEFFICIENT |
| C38 | $x^7y$ | COEFFICIENT |
| C39 | $x^6y^2$ | COEFFICIENT |
| C40 | $x^5y^3$ | COEFFICIENT |
| C41 | $x^4y^4$ | COEFFICIENT |
| C42 | $x^3y^5$ | COEFFICIENT |
| C43 | $x^2y^6$ | COEFFICIENT |
| C44 | $xy^7$ | COEFFICIENT |
| C45 | $y^8$ | COEFFICIENT |

Figure 9:
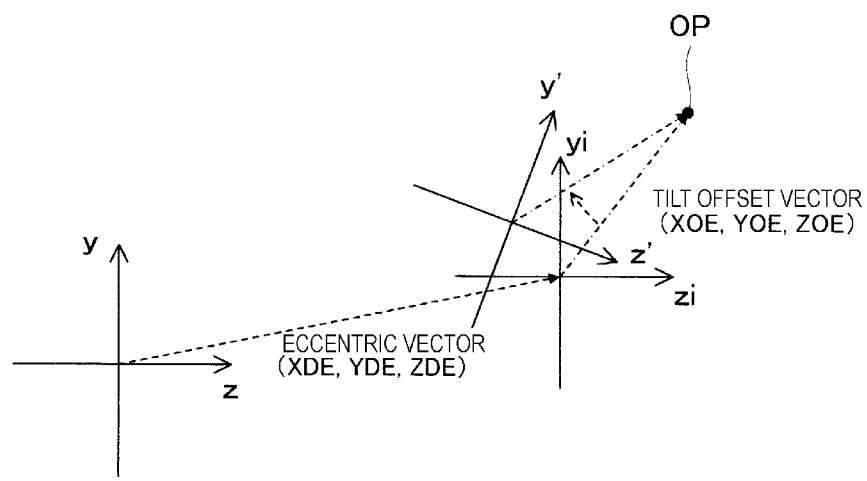
FIG. 9 is a conceptual diagram illustrating an eccentricity and a tilt of an optical surface.

FIG. 9 is a conceptual diagram illustrating an eccentricity and a tilt of an optical surface. The optical system in Example 1 was formed by combining an eccentricity and a tilt between optical surfaces. Specifically, coordinates (xi, yi, zi) were obtained by performing an operation of translation on original coordinates (x, y, z) by an eccentric vector (XDE, YDE, ZDE). Then, coordinates (x', y', z') to which the eccentricity and the tilt were provided by rotating the coordinates (xi, yi, zi) about a tilt offset point moved by a tilt offset vector (XOD, YOD, ZOD) with respect to an origin of the coordinates (xi, yi, zi) were obtained.

Table 2 below indicates parameters for each surface constituting the virtual image display apparatus of Example 1. A unit of a distance in the table is mm.

TABLE 2

| SURFACE NUMBER | SURFACE NAME | SURFACE TYPE | y CURVATURE RADIUS | SURFACE INTERVAL | MATERIAL | REFRACTION/ REFLECTION |
|---|---|---|---|---|---|---|
| IMAGE | | SPHERE | 0 | INFINITE | | REFRACTION |
| APERTURE | | SPHERE | 0 | 0 | | REFRACTION |
| 2 | M1 | xy POLYNOMIAL SURFACE | −0.251487242 | 0 | | REFLECTION |
| 3 | | SPHERE | 0 | 0 | | REFRACTION |
| 4 | | xy POLYNOMIAL SURFACE | −0.077216432 | 0 | RESIN A | REFRACTION |
| 5 | M2 | xy POLYNOMIAL SURFACE | −0.085707679 | 0 | RESIN A | REFLECTION |
| 6 | | xy POLYNOMIAL SURFACE | −0.077216432 | 0 | | REFRACTION |
| 7 | | SPHERE | 0 | 0 | | REFRACTION |
| 8 | M3 | xy POLYNOMIAL SURFACE | −0.035420107 | 0 | | REFLECTION |
| 9 | | SPHERE | 0 | −1.1 | SILICA | REFRACTION |
| OBJECT | | SPHERE | 0 | 0 | | REFRACTION |

In the table, "image" means the exit pupil EP, and "object" means the display surface 11a of the display device 11. In this case, a light beam is followed from the exit pupil EP toward the display surface 11a. M1 to M3 being the surface names respectively mean the reflecting surface 23r of the third mirror member 23, the mirror surface 22r of the second mirror member 22, and the reflecting surface 21r of the first mirror member 21. Table 2 indicates the vertical y curvature radius, the surface interval between adjacent surfaces, the material for the refractive medium, and the surface distinction that is the refraction or reflection. Note that, in the material for the refractive medium, the resin A means a resin material having a refractive index of approximately 1.53 in a visible range and an Abbe number of 56, and SILICA means a quartz glass having a refractive index of approximately 1.47 in the visible range.

Table 3 below is a table summarizing the coefficients $C_i$ of the polynomials that provide a free curved surface included in Example 1.

TABLE 3

| | s2 | s4 | s5 | s6 | s8 |
|---|---|---|---|---|---|
| NORMALIZED RADIUS | 10 | 10 | 10 | 10 | 10 |
| C1 | −1 | 0 | 0 | 0 | 0 |
| C2 | 0 | 0 | 0 | 0 | 0 |
| C3 | 9.982 | −39.823 | −45.797 | −39.823 | 1.428 |
| C4 | 11.669 | −9.608 | −7.784 | −9.608 | −0.176 |
| C5 | 0 | 0 | 0 | 0 | 0 |
| C6 | 6.952 | −45.967 | 21.298 | −45.967 | 1.063 |
| C7 | 0 | 0 | 0 | 0 | 0 |
| C8 | −0.209 | −25.4 | −29.528 | −25.4 | −0.021 |
| C9 | 0 | 0 | 0 | 0 | 0 |
| C10 | 1.202 | −42.064 | 59.353 | −42.064 | 0.437 |
| C11 | −1.09 | −2.688 | −29.985 | −2.688 | 0.585 |
| C12 | 0 | 0 | 0 | 0 | 0 |
| C13 | −0.074 | −24.957 | −107.003 | −24.957 | 0.102 |
| C14 | 0 | 0 | 0 | 0 | 0 |
| C15 | −0.064 | −21.04 | −50.069 | −21.04 | 0.021 |
| C16 | 0 | 0 | 0 | 0 | 0 |
| C17 | 1.456 | −2.811 | −74.965 | −2.811 | 0.653 |
| C18 | 0 | 0 | 0 | 0 | 0 |
| C19 | 0.198 | −10.297 | −277.859 | −10.297 | 0.07 |
| C20 | 0 | 0 | 0 | 0 | 0 |
| C21 | −0.013 | −5.17 | −175.021 | −5.17 | −0.057 |
| C22 | −0.056 | 0 | 23.291 | 0 | 0.069 |
| C23 | 0 | 0 | 0 | 0 | 0 |
| C24 | −0.736 | 0 | −22.455 | 0 | 0.125 |
| C25 | 0 | 0 | 0 | 0 | 0 |
| C26 | −0.107 | 0 | −331.169 | 0 | −0.02 |
| C27 | 0 | 0 | 0 | 0 | 0 |
| C28 | −0.006 | 0 | −114.629 | 0 | −0.023 |
| C29 | 0 | 0 | 0 | 0 | 0 |
| C30 | 0.038 | 0 | 71.689 | 0 | 0.058 |
| C31 | 0 | 0 | 0 | 0 | 0 |
| C32 | 0.164 | 0 | 71.122 | 0 | −0.072 |
| C33 | 0 | 0 | 0 | 0 | 0 |
| C34 | 0.024 | 0 | −171.171 | 0 | −0.025 |
| C35 | 0 | 0 | 0 | 0 | 0 |
| C36 | 0.002 | 0 | −6.561 | 0 | −0.004 |
| C37 | 0 | 0 | 1.779 | 0 | 0.003 |
| C38 | 0 | 0 | 0 | 0 | 0 |
| C39 | −0.007 | 0 | 51.96 | 0 | 0.01 |
| C40 | 0 | 0 | 0 | 0 | 0 |
| C41 | −0.014 | 0 | 49.26 | 0 | −0.023 |
| C42 | 0 | 0 | 0 | 0 | 0 |
| C43 | −0.002 | 0 | −27.913 | 0 | −0.005 |
| C44 | 0 | 0 | 0 | 0 | 0 |
| C45 | 0 | 0 | 10.694 | 0 | 0 |

In the table, the symbols s2, s4, s5, s6, and s8 correspond to the surface numbers of Table 2. s2 means the reflecting surface 23r of the third mirror member 23. s4 and s6 mean the refractive surface 22e of the second mirror member 22. s5 means the mirror surface 22r of the second mirror member 22. s8 means the reflecting surface 21r of the first mirror member 21. Note that the numerical value of the coefficient is expressed by using the normalized curvature radius.

Table 4 below is a table summarizing an eccentricity and a tilt of an optical surface included in Example 1. A unit of a distance is mm, and a unit of an angle is ° (degree) in the table.

TABLE 4

| | s2 | s4 | s5 | s6 | s8 |
|---|---|---|---|---|---|
| x COORDINATE | 0 | 0 | 0 | 0 | 0 |
| y COORDINATE | −44.56 | 25.21 | 41.1 | 25.21 | 40.71 |

TABLE 4-continued

|  | s2 | s4 | s5 | s6 | s8 |
|---|---|---|---|---|---|
| z COORDINATE | −16.66 | 21.76 | 16.38 | 21.76 | 32.48 |
| ROTATE ABOUT x AXIS | −55.46 | −61.18 | −75.63 | −61.18 | 56.81 |
| ROTATE ABOUT y AXIS | 0 | 0 | 0 | 0 | 0 |
| ROTATE ABOUT z AXIS | 0 | 0 | 0 | 0 | 0 |

In the table, the symbols s2, s4, s5, s6, and s8 indicate the same optical surfaces as shown in Table 3.

Second Exemplary Embodiment

Hereinafter, a virtual image display apparatus according to Second Exemplary Embodiment of the present disclosure will be described. Note that the virtual image display apparatus according Second Exemplary Embodiment is obtained by modifying a part of the virtual image display apparatus according to First Exemplary Embodiment, and description on common portions is omitted.

Figure 10:
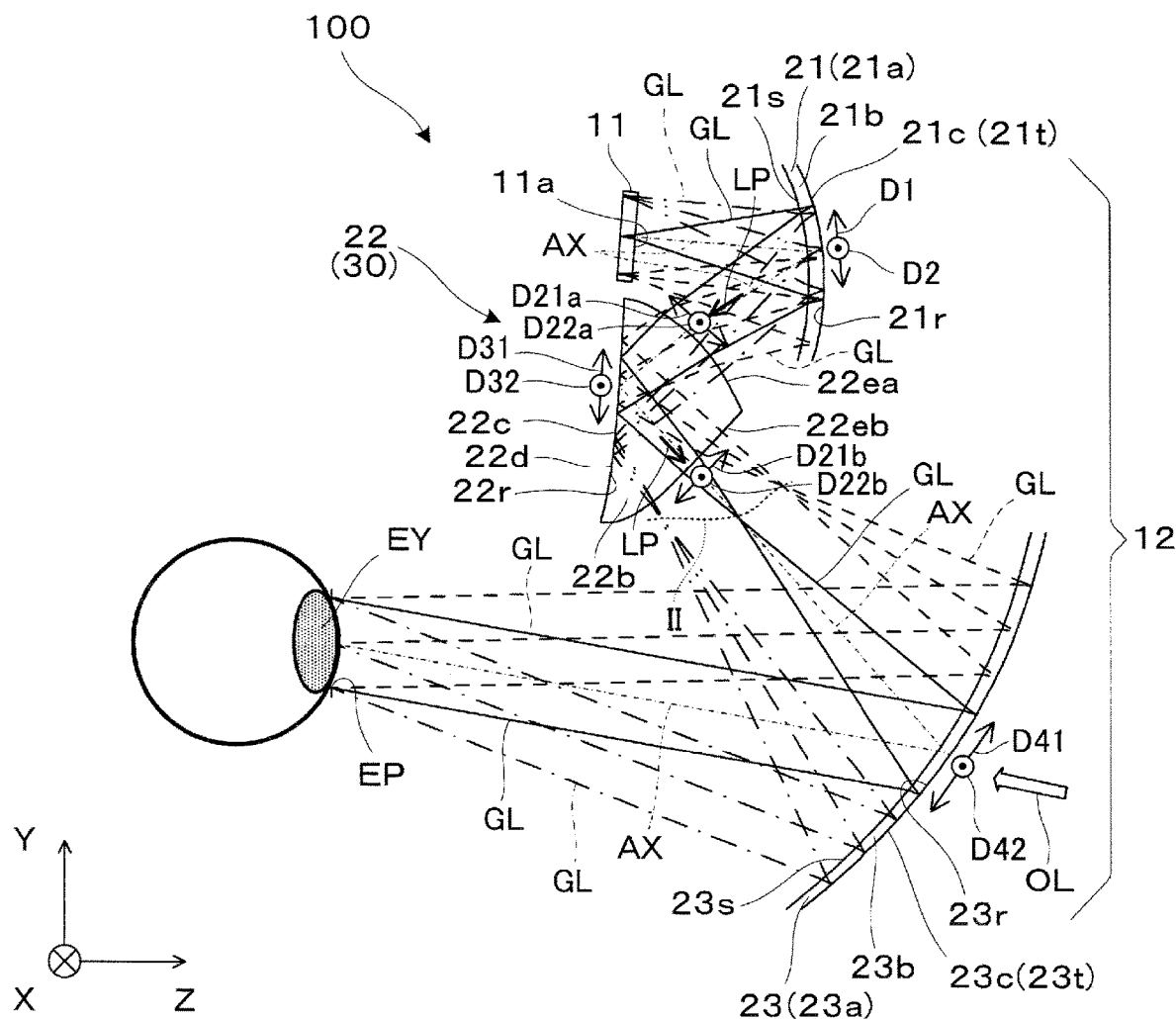
FIG. 10 is a side cross-sectional view illustrating an optical structure and the like of a virtual image display apparatus according to Second Exemplary Embodiment.

As illustrated in FIG. 10, a virtual image display apparatus 100 in Second Exemplary Embodiment includes, as a projection optical system 12, a first mirror member 21, a second mirror member 22, and a third mirror member 23, similar to First Exemplary Embodiment, but a refractive surface 22e of the second mirror member 22 being a refractive reflective optical member 30 is not a common incidence-emission surface for imaging light GL. The second mirror member 22 includes, as the refractive surface 22e, an incidence surface 22ea on which the imaging light GL from the first mirror member 21 is incident, and an emission surface 22eb on which the imaging light GL reflected by a mirror surface 22r is incident. The incidence surface 22ea and the emission surface 22eb are independent in optical path to each other.

The incidence surface 22ea of the second mirror member 22 is, for example, a free curved surface, but may also be an aspheric surface. The incidence surface 22ea is asymmetric across an optical axis AX with respect to a first direction D21a corresponding to an eccentric direction in the YZ plane, and is symmetric across the optical axis AX with respect to a second direction D22a or the X direction orthogonal to the first direction D21a. The emission surface 22eb of the second mirror member 22 is, for example, a free curved surface, but may also be an aspheric surface. The emission surface 22eb is asymmetric across the optical axis AX with respect to a first direction D21b corresponding to the eccentric direction in the YZ plane, and is symmetric across the optical axis AX with respect to a second direction D22b or the X direction orthogonal to the first direction D21b.

The incidence surface 22ea and the emission surface 22eb that are the refractive surface 22e are substantially perpendicular to a principal ray LP from the center of a screen. The principal ray from the center of the screen is substantially parallel to the optical axis AX in FIG. 10. Herein, "substantially perpendicular" means a range of from approximately 65° to 115°. By setting the incidence surface 22ea and the emission surface 22eb substantially perpendicular to the principal ray from the center of the screen, occurrence of chromatic aberrations can be suppressed.

In a case of Second Exemplary Embodiment, the first mirror member 21 and the third mirror member 23 are rear surface mirrors. In other words, the first mirror member 21 has a structure in which one surface 21s of a plate-like body 21b is a refractive surface and a mirror film 21c is formed on the other surface 21t. A reflecting surface 21r of the first mirror member 21 has a shape corresponding to an inner surface of the mirror film 21c or the surface 21t of the plate-like body 21b. An antireflective coating may also be formed at one surface 21s being the refractive surface. One surface 21s extends in substantially parallel with the other surface 21t, and hardly has an aberration correction function. The third mirror member 23 has a structure in which one surface 23s of a plate-like body 23b is a refractive surface and a mirror film 23c is formed on the other surface 23t. A reflecting surface 23r of the third mirror member 23 has a shape corresponding to an inner surface of the mirror film 23c or the surface 23t of the plate-like body 23b. An antireflective coating may also be formed at one surface 23s being the refractive surface. One surface 23s extends in substantially parallel with the other surface 23t, and hardly has an aberration correction function.

The first mirror member 21 and the third mirror member 23 are not limited to a rear surface mirror, and may be a surface mirror similar to that in First Exemplary Embodiment.

As described above, instead of using the second mirror member 22 as the semi-separate type refractive reflective optical member 30 including the pair of the incidence surface 22ea and the emission surface 22eb, the first mirror member 21 may be used as the semi-separate type refractive reflective optical member 30 including a pair of an incidence surface and an emission surface, and both of the first mirror member 21 and the second mirror member 22 may also be used as the semi-separate type refractive reflective optical member 30 including a pair of an incidence surface and an emission surface.

Third Exemplary Embodiment

Hereinafter, a virtual image display apparatus according to Third Exemplary Embodiment of the present disclosure will be described. Note that the virtual image display apparatus according Third Exemplary Embodiment is obtained by modifying a part of the virtual image display apparatus according to First Exemplary Embodiment, and description on common portions is omitted.

Figure 11:
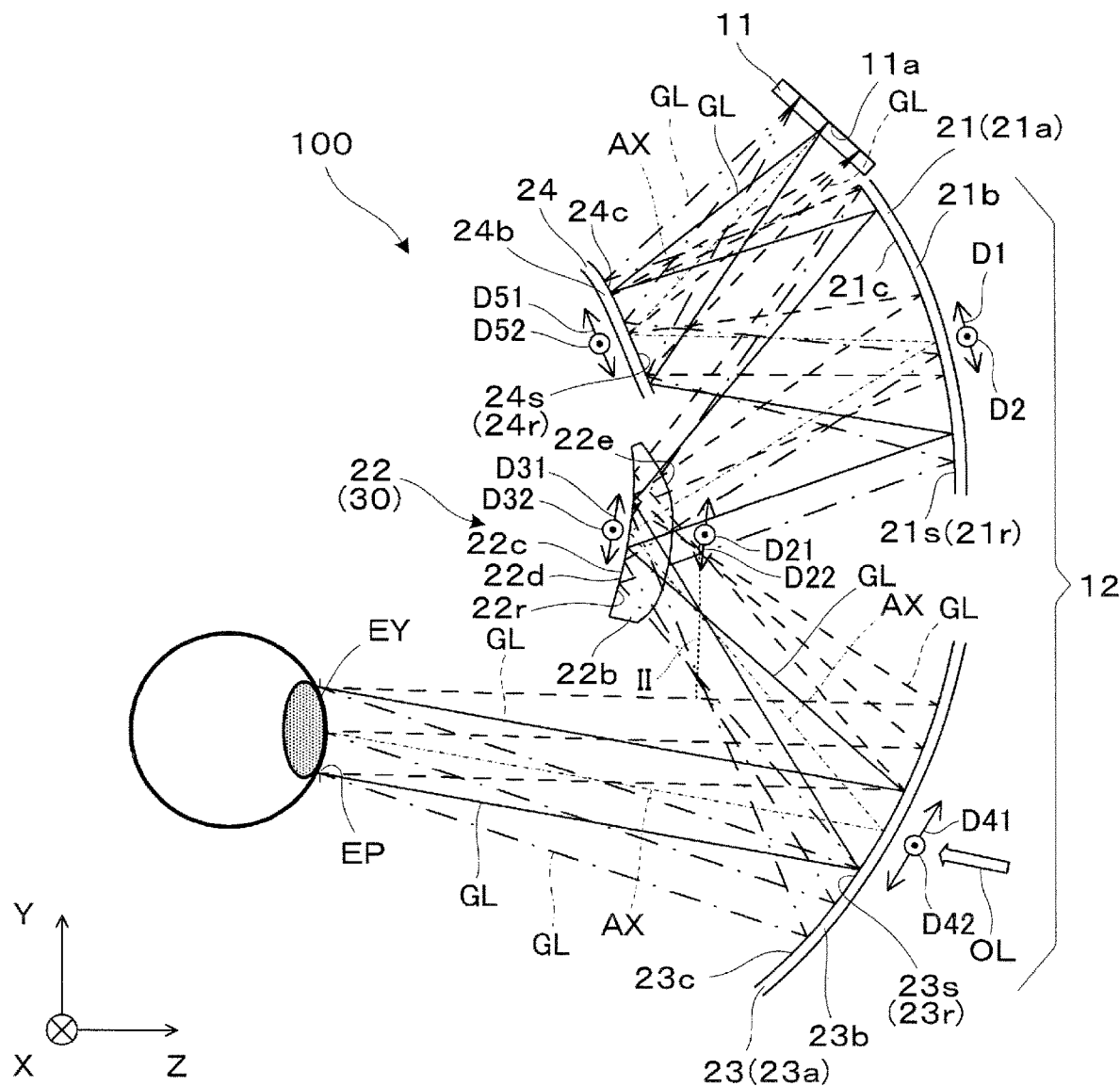
FIG. 11 is a side cross-sectional view illustrating an optical structure and the like of a virtual image display apparatus according to Third Exemplary Embodiment.

As illustrated in FIG. 11, a virtual image display apparatus 100 in Third Exemplary Embodiment includes, as a projection optical system 12, a first mirror member 21, a second mirror member 22, and a third mirror member 23, similar to the first exemplary embodiment, but further includes a fourth mirror member 24 on an optical path between a display device (image forming unit) 11 and the first mirror member 21. This optical configuration may be considered from a different viewpoint that a fourth mirror member (corresponding to the mirror member 21) is further provided on the optical path between a first mirror member (corresponding to the mirror member 24) and the second mirror member 22.

The fourth mirror member 24 is a plate-like piece that functions as a surface mirror. In other words, the fourth mirror member 24 is a mirror plate 24a having a structure in which a mirror film 24c is formed at one surface 24s of a plate-like body 24b. A reflecting surface 24r of the fourth mirror member 24 is, for example, a free curved surface, and has a shape corresponding to a surface of the mirror film 24c or the surface 24s of the plate-like body 24b. The reflection surface 24r is not limited to a free curved surface, and may be an aspheric surface. The reflecting surface 24r is asymmetric across an optical axis AX with respect to a first direction D51 corresponding to an eccentric direction in the YZ plane, and is symmetric across the optical axis AX with respect to a second direction D52 or the X direction orthogonal to the first direction D51. The plate-like body 24*b* of the fourth mirror member 24 is made of, for example, resin, but may also be made of glass. The mirror film 24*c* is made of, for example, metal, but may also be a dielectric multilayer film.

The first mirror member 21 and the third mirror member 23 are not limited to surface mirrors, and may be rear surface mirrors including mirror films 21*c* and 23*c* formed on rear surfaces of plate-like bodies 21*b* and 23*b*. The fourth mirror member 24 may also be a rear surface mirror including the mirror film 24*c* formed on the rear surface of the plate-like body 24*b*.

Example 2

Hereinafter, Example 2 in which an optical system of the virtual image display apparatus 100 according to Third Exemplary Embodiment was realized will be described. Data of Example 2 are also expressed in a manner similar to the data of Example 1, and redundant descriptions of the definitions and the like of the terms are omitted.

Table 5 below indicates parameters for each surface constituting the virtual image display apparatus of Example 2. A unit of a distance in the table is mm.

TABLE 5

| SURFACE NUMBER | SURFACE NAME | SURFACE TYPE | y CURVATURE RADIUS | SURFACE INTERVAL | MATERIAL | REFRACTION/ REFLECTION |
|---|---|---|---|---|---|---|
| IMAGE APERTURE | | SPHERE | 0 | INFINITE | | REFRACTION |
| | | SPHERE | 0 | 0 | | REFRACTION |
| 2 | M1 | xy POLYNOMIAL SURFACE | −0.02164779 | 0 | | REFLECTION |
| 3 | | ASPHERIC SURFACE | 0 | −1.1 | RESIN A | REFRACTION |
| 4 | M2 | xy POLYNOMIAL SURFACE | −0.019355916 | 0 | RESIN A | REFLECTION |
| 5 | | | | 1.1 | | REFRACTION |
| 6 | | SPHERE | 0 | 0 | | REFRACTION |
| 7 | M3 | xy POLYNOMIAL SURFACE | −0.018169554 | 0 | | REFLECTION |
| 8 | | SPHERE | 0 | 0 | | REFRACTION |
| 9 | M4 | xy POLYNOMIAL SURFACE | 0.0209986 | 0 | | REFLECTION |
| 10 | | SPHERE | 0 | 1.1 | SILICA | REFRACTION |
| OBJECT | | SPHERE | 0 | 0 | | REFRACTION |

In the table, M1 to M4 being the surface names respectively mean the reflecting surface 23*r* of the third mirror member 23, the mirror surface 22*r* of the second mirror member 22, the reflecting surface 21*r* of the first mirror member 21, and the reflecting surface 24*r* of the fourth mirror member 24.

Table 6 below is a table summarizing the coefficients $C_i$ of the polynomials that provide a free curved surface included in Example 2.

TABLE 6

| | s2 | s4 | s5 | s6 | s7 | s9 |
|---|---|---|---|---|---|---|
| NORMALIZED RADIUS | 1 | 1 | 1 | 1 | 1 | 1 |
| C1 | −6.5 | 0 | −97.1 | 0 | 1.6 | −6.1 |
| C2 | 0 | 0 | 0 | 0 | 0 | 0 |
| C3 | 9.82E−02 | 4.16E−02 | 5.16E−02 | 4.16E−02 | −3.69E−02 | 8.85E−01 |
| C4 | −2.02E−03 | 4.17E−03 | 4.17E−03 | 4.17E−03 | −5.68E−03 | −1.28E−02 |
| C5 | 0 | 0 | 0 | 0 | 0 | 0 |
| C6 | −1.24E−03 | −1.10E−02 | −1.40E−02 | −1.10E−02 | 6.08E−03 | 2.92E−03 |
| C7 | 0 | 0 | 0 | 0 | 0 | 0 |
| C8 | −2.84E−04 | 1.04E−03 | 1.34E−03 | 1.04E−03 | 1.15E−06 | −9.65E−05 |
| C9 | 0 | 0 | 0 | 0 | 0 | 0 |
| C11 | −1.49E−04 | −5.85E−04 | −9.85E−04 | −5.85E−04 | −5.11E−04 | 9.14E−05 |
| C11 | −9.57E−06 | −9.45E−05 | −1.05E−04 | −9.45E−05 | −1.58E−06 | −1.98E−07 |
| C12 | 0 | 0 | 0 | 0 | 0 | 0 |
| C13 | 2.17E−06 | −1.51E−04 | −2.11E−04 | −1.51E−04 | 1.79E−06 | −6.53E−06 |
| C14 | 0 | 0 | 0 | 0 | 0 | 0 |
| C15 | 2.54E−06 | −1.01E−04 | −2.01E−04 | −1.01E−04 | 1.58E−05 | −2.30E−04 |
| C16 | 0 | 0 | 0 | 0 | 0 | 0 |
| C17 | 3.29E−07 | 0 | −1.44E−06 | 0 | 2.69E−08 | −1.56E−07 |
| C18 | 0 | 0 | 0 | 0 | 0 | 0 |

TABLE 6-continued

|  | s2 | s4 | s5 | s6 | s7 | s9 |
|---|---|---|---|---|---|---|
| C19 | −9.11E−07 | 0 | −1.35E−05 | 0 | −6.45E−08 | −3.15E−06 |
| C20 | 0 | 0 | 0 | 0 | 0 | 0 |
| C21 | −1.42E−07 | 0 | −1.62E−05 | 0 | −2.77E−07 | 1.66E−05 |
| C22 | 6.29E−09 | 0 | 3.51E−07 | 0 | −6.87E−10 | 4.98E−09 |
| C23 | 0 | 0 | 0 | 0 | 0 | 0 |
| C24 | −7.63E−09 | 0 | 8.79E−07 | 0 | −2.50E−10 | 9.32E−08 |
| C25 | 0 | 0 | 0 | 0 | 0 | 0 |
| C26 | 4.86E−08 | 0 | −3.89E−08 | 0 | −6.08E−11 | 9.78E−08 |
| C27 | 0 | 0 | 0 | 0 | 0 | 0 |
| C28 | 2.26E−09 | 0 | −3.19E−07 | 0 | 1.67E−09 | −2.12E−06 |
| C29 | 0 | 0 | 0 | 0 | 0 | 0 |
| C30 | −3.43E−10 | 0 | 0 | 0 | 0 | 0 |
| C31 | 0 | 0 | 0 | 0 | 0 | 0 |
| C32 | −1.63E−11 | 0 | 0 | 0 | 0 | 0 |
| C33 | 0 | 0 | 0 | 0 | 0 | 0 |
| C34 | −9.05E−10 | 0 | 0 | 0 | 0 | 0 |
| C35 | 0 | 0 | 0 | 0 | 0 | 0 |
| C36 | −1.17E−11 | 0 | 0 | 0 | 0 | 0 |

In the table, the symbols s2, s4, s5, s6, s7, and s9 correspond to the surface numbers in Table 5.

Table 7 below is a table summarizing an eccentricity and a tilt of an optical surface included in Example 2. A unit of a distance is mm, and a unit of an angle is ° (degree) in the table.

TABLE 7

|  | s2 | s4 | s5 | s6 | s7 | s9 |
|---|---|---|---|---|---|---|
| x COORDINATE | 0 | 0 | 0 | 0 | 0 | 0 |
| y COORDINATE | −18.57 | 23.14 | 24.86 | 23.14 | 21.16 | 23.6 |
| z COORDINATE | 32.68 | 20.11 | 20.16 | 20.11 | 45.28 | 25.11 |
| ROTATE ABOUT x AXIS | −44.41 | 1.26 | 1.26 | 1.26 | −9.67 | 65.9 |
| ROTATE ABOUT y AXIS | 0 | 0 | 0 | 0 | 0 | 0 |
| ROTATE ABOUT z AXIS | 0 | 0 | 0 | 0 | 0 | 0 |

In the table, the symbols s2, s4, s5, s6, s7, and s9 indicate the same optical surfaces as shown in Table 6.

As described above, instead of using the second mirror member 22 as the refractive reflective optical member 30, the first mirror member 21 or the fourth mirror member 24 may be used as the refractive reflective optical member 30, and two or more of the first mirror member 21, the second mirror member 22, and the fourth mirror member 24 may also be used as the refractive reflective optical member 30.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display apparatus 100 in the above-described exemplary embodiments, a self-luminous type display element such as an organic EL element is used as the display device 11. Instead, a configuration in which a laser scanner obtained by combining a laser light source and a scanner, such as a polygon mirror, may also be used as the display device 11. In other words, the present disclosure is also applicable to a laser retinal projection type head-mounted display.

The mirror surface 22r of the second mirror member 22 is not limited to the mirror surface 22r formed of the mirror layer 22c, and may be a total reflection surface that satisfies the total reflection conditions.

A light control device that controls light by limiting transmitted light of the third mirror member 23 may be attached to the external side of the third mirror member 23. The light control device adjusts a transmittance, for example, electrically. Mirror liquid crystals, electronic shades, and the like may be used as the light control device. The light control device may adjust a transmittance according to external light brightness. When the light control device blocks the external light OL, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

The mirror film 23c of the third mirror member 23 is not limited to the mirror film 23 having semi-transmissive property, and may be configured to reflect a specific polarization component, such as a wire grid element. The mirror film 23c of the third mirror member 23 may also be constituted by a volume hologram or the other hologram element, or may also be constituted by a diffraction grating.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

What is claimed is:

1. A virtual image display apparatus comprising:
an image forming unit;
a first mirror member that reflects an imaging light from the image forming unit;
a second mirror member that reflects the imaging light reflected by the first mirror member; and
a third mirror member of a transmissive type that reflects the imaging light reflected by the second mirror member toward a position of an exit pupil, wherein
the second mirror member is a refractive reflective optical member that includes a refractive member including a refractive surface, an antireflective coating provided along the refractive surface, and a mirror surface formed at a non-refractive surface of the refractive member, the refractive surface is a surface on which the imaging light reflected by the first mirror member is incident, and the refractive surface emits the imaging light reflected by the mirror surface to the third mirror member.

2. The virtual image display apparatus according to claim 1, wherein the refractive reflective optical member includes, as the refractive surface, an incidence surface and an emission surface provided independently of each other to transmit imaging light before and after reflection by the mirror surface.

3. The virtual image display apparatus according to claim 1, wherein a reflecting surface or a mirror surface of the first mirror member, the second mirror member, and the third mirror member is an aspheric surface or a free curved surface.

4. The virtual image display apparatus according to claim 1, wherein a refractive surface of the refractive reflective optical member is an aspheric surface or a free curved surface.

5. The virtual image display apparatus according to claim 4, wherein the refractive surface is substantially perpendicular to a principal ray from the center of a screen.

6. The virtual image display apparatus according to claim 1, wherein
the first mirror member and the third mirror member each are a mirror plate having a structure in which a mirror film is formed at one surface of a plate-like body.

7. The virtual image display apparatus according to claim 1, further comprising a fourth mirror member on an optical path between the first mirror member and the image forming unit or between the first mirror member and the second mirror member.

8. The virtual image display apparatus according to claim 1, wherein the image forming unit displays a distorted modification image for correcting a distortion aberration by the first mirror member, the second mirror member, and the third mirror member.

9. The virtual image display apparatus according to claim 1, wherein the third mirror member covers a position of the exit pupil and has a shape concaved toward the exit pupil.

10. The virtual image display apparatus according to claim 1, wherein an optical axis passing through the first mirror member, the second mirror member, and the third mirror member is arranged along a plane extending in a substantially vertical direction intersecting a lateral direction in which a pair of pupils of an observer are aligned.

11. The virtual image display apparatus according to claim 10, wherein the first mirror member and the second mirror member are disposed on an upper side of the third mirror member to correspond to a head side of an observer.

12. The virtual image display apparatus according to claim 1, wherein the refractive member of the refractive reflective optical member includes a material having an Abbe number greater than or equal to 50.

13. The virtual image display apparatus according to claim 1, wherein a distance between the second mirror member and a position of the exit pupil is greater than or equal to 14 mm.

* * * * *